UNITED STATES PATENT OFFICE.

JOHANN BAMMANN AND MORITZ ULRICH, OF ELBERFELD, GERMANY, ASSIGNORS TO THE FARBENFABRIKEN, VORMALS FR. BAYER & CO., OF SAME PLACE.

BLUE DYE.

SPECIFICATION forming part of Letters Patent No. 556,298, dated March 10, 1896.

Application filed September 11, 1895. Serial No. 562,154. (Specimens.) Patented in England August 26, 1890, No. 13,443; in Austria-Hungary November 28, 1890, No. 35,494 and No. 58,417; in France December 6, 1890, No. 210,033, and in Italy April 27, 1891, XXV, 29,631, LVIII, 100.

*To all whom it may concern:*

Be it known that we, JOHANN BAMMANN and MORITZ ULRICH, doctors of philosophy, chemists, and assignors to the FARBENFA-BRIKEN, VORMALS FRIEDRICH BAYER & CO., of Elberfeld, Germany, subjects of the Emperor of Germany, residing at Elberfeld, Germany, have invented a new and useful Improvement in the Manufacture of Blue Substantive Dyes, (for which the aforesaid FARBENFABRIKEN have already obtained Letters Patent in the following countries: England, No. 13,443, dated August 26, 1890; France, No. 210,033, dated December 6, 1890; Italy, XXV, 29,631, and LVIII, 100, dated April 27, 1891, and Austria-Hungary, No. 35,494 and No. 58,417, dated November 28, 1890,) of which the following is a specification.

Our invention relates to the production of a new class of violet-blue to greenish-blue mixed substantive dye-stuffs by combining in equi-molecular proportions any tetrazo body with amidonaphtholdisulfo-acid, and a hydroxy derivative of naphthalene, &c., these dye-stuffs having the general formula:

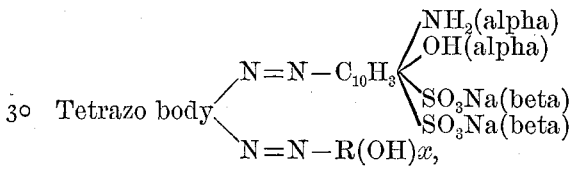

30 Tetrazo body in which "tetrazo body" means any tetrazotized diamin, such as benzidin, tolidin, their homologues and analogous bodies, sulfo-acids and carboxy-acids thereof, and "R" means naphthalene, and "$x$" any number of hydroxyl groups.

By amidonaphtholdisulfo-acid we understand that alpha-amido-alpha-naphthol-beta-disulfo-acid, which is described in our United States Patent No. 540,412, dated June 4, 1895, and which was first produced by us by melting with caustic alkalies, most practically at a temperature from about 180° to 190° centigrade, the alpha-naphthylamintrisulfo-acid, which is derived from the naphthalenetrisulfo-acid of Gürke and Rudolph, and was first prepared by nitrating the said naphthalenetrisulfo-acid and reducing the so-formed alpha-mononitronaphthalenetrisulfo-acid. This amidonaphtholdisulfo-acid, usually termed 1:8 amidonaphthol-beta-disulfo-acid, is identical with the amidonaphtholdisulfo-acid H, which has been obtained afterward by converting naphthalene 2:7 disulfo-acid into its dinitro compound, reducing the latter and heating the so-formed diamidonaphthalene-disulfo-acid with diluted acids, as mentioned in the specification forming part of Letters Patent to Meinhard Hoffmann, No. 464,135, dated December 1, 1891.

Our new 1:8 amidonaphtholdisulfo-acid can be utilized for the preparation of azo dye-stuffs of every known description, and in our United States Patents No. 499,198, dated June 13, 1893, No. 498,873, dated June 6, 1893, No. 544,699, dated August 20, 1895, and No. 544,700, dated August 20, 1895, we have described some typical representatives of these new coloring-matters, which are of great value in the arts.

For the production of the new coloring-matters which are the subject of the present application, we combine one molecule of the known tetrazo bodies—such as tetrazo-diphenyl, tetrazo-ditolyl, tetrazo-phenyl-tolyl, tetrazo-diphenol ethers, tetrazo-ethoxy diphenyl, tetrazo-ethoxy phenyl-tolyl, and their sulfo-acids—with one molecule of 1:8 amidonaphtholdisulfo-acid. The thus-formed intermediate body is then combined with one molecule of any hydroxy derivative of naphthaline. The formation of the intermediate bodies can be accomplished either in alkaline or in weak acetic-acid solution. The same dye-stuffs are also obtained if the tetrazo body is first combined with the hydroxy derivative and afterward with the 1:8 amidonaphtholdisulfo-acid.

The thus-obtained coloring-matters dye unmordanted cotton in an alkaline bath, or in a bath containing salt, violet-blue to greenish-blue shades. On the fiber the dye-stuffs can be rediazotized and deeper blue or bluish-black shades can be developed on the fiber by means of the substances used in the arts for this purpose—such as phenol-resorcin, beta-naphthol, meta-phenylene-diamin, naphthylamin, salt R, &c.

The new dye-stuffs contain the characteristic group:

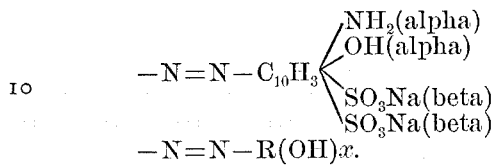

They form after drying and pulverizing grayish-black powders, which are soluble in water with violet-blue to greenish-blue color. They are insoluble in diluted hydrochloric or sulfuric acid, but they dissolve in concentrated sulfuric acid with blue color, and on the addition of ice-water a fine precipitate is gradually formed.

In carrying out our process practically we proceed as follows: 2.12 kilos, by weight, of ortho-tolidin or the corresponding quantity of a salt thereof, are converted in hydrochloric-acid solution by means of 1.4 kilos, by weight, of sodium nitrite into tetrazo-orthoditolyl-chlorid. A solution in water of 3.63 kilos, by weight, of the sodium salt of the above specified 1:8 amidonaphthol-beta-disulfo-acid is then allowed to flow into the above tetrazo solution, keeping the resulting solution either moderately alkaline, by adding, for instance, sodium carbonate, or rendering the same weakly acid by means of acetic acid. When, after some hours, the formation of the intermediate product is complete, the latter is separated by means of common salt filtered off and introduced into an acetic-acid mixture obtained by mixing three kilos, by weight, of sodium acetate, 1.6 kilos, by weight, of dihydroxynaphthalene, which is obtained in a most comminuted condition by dissolving it first in soda-lye and decomposing the sodium salt of the dihydroxynaphthalene by means of acetic acid. However, it is not necessary to filter off previously the first-formed intermediate product, but the above weakly alkaline or acetic-acid solution containing the intermediate product from one molecular proportion of tetrazo-orthoditolylchlorid and one molecular proportion of 1:8 amidonapthol-beta-disulfo-acid can directly be added to the acetic-acid mixture of dihydroxynaphthalene. The resulting mixture is kept moderately acid by means of acetic acid, and after some hours the reaction is completed by heating at about 60° centigrade. After rendering alkaline, for instance, by means of sodium carbonate, the dye-stuff is isolated in the usual manner, viz: by salting out, filtering off, pressing, and drying. In the same manner as the sodium salt of the specified amidonaphtholdisulfo-acid, also the corresponding quantity of another alkaline salt or acid salt thereof can be employed. Of course, the dihydroxynaphthalene can also be coupled in an alkaline solution with the intermediate product.

Our new dye-stuff having the formula:

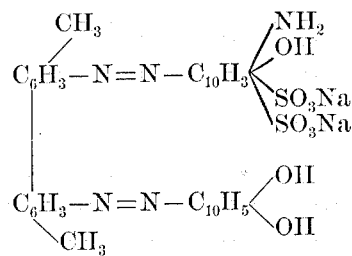

forms after drying and pulverizing a grayish-black powder soluble in water with violet color. It dissolves in ammonia with pure blue color. In sodium carbonate it is little soluble at ordinary temperature with violet color, more easily on heating with dark-blue color. It sparingly dissolves in soda-lye with violet color at ordinary temperature, more readily on heating with from dark-violet to bluish-red color. It is insoluble in diluted hydrochloric and sulfuric acid. The color of its solutions in water becomes pure blue, if a small quantity of soda-lye is added, dark reddish-blue flakes being gradually separated. By mixing its watery solutions with diluted hydrochloric or sulfuric acid in an excess the separation of dark-blue flakes takes place. It dissolves in concentrated sulfuric acid with blue color, which, on adding ice-water, turns into reddish blue, while a fine dark-blue precipitate is gradually separated. It produces on unmordanted cotton blue shades. When the fiber dyed with our new product is placed in a moderately acid solution of sodium nitrite and subsequently in a weakly alkaline bath of beta-naphthol, deeper blue or bluish-black shades result.

Having thus described the nature of our invention and in what manner the same is to be carried out, we declare what we claim as new, and desire to secure by Letters Patent, is—

1. The process of producing new violet-blue to greenish-blue mixed substantive dye-stuffs by combining equi-molecular proportions of any of the known tetrazo bodies with 1:8 amidonaphtholdisulfo-acid and any of the hydroxy derivatives of naphthalene, substantially as described.

2. As new articles of manufacture, the new class of bodies having the general formula:

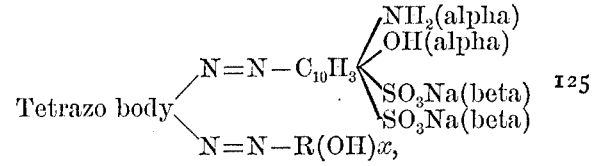

which are producible by combining equi-molecular proportions of any of the known tetrazo bodies with 1:8 amidonaphtholdisulfo acid and any of the hydroxy derivatives of naphthalene and which dye unmordanted cotton in the manner well known in the arts for the application of substantive cotton dye-stuffs, violet-blue to greenish-blue shades, which can be rediazotized on the fiber and converted into deeper blue or bluish-black shades by means of the so-called developers, and which form after drying and pulverizing grayish-black powders which are soluble in water with violet-blue to greenish-blue color, insoluble in diluted hydrochloric or sulfuric acid, but dissolve in concentrated sulfuric acid with blue color, in which solution the addition of ice-water produces a fine precipitate, substantially as described.

3. As a new article of manufacture, the specific color, having the formula:

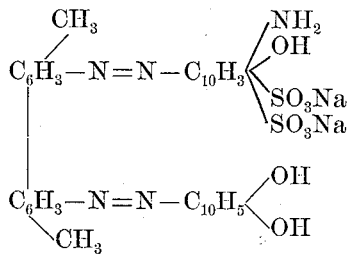

producible by combining equi-molecular proportions of tetrazo-ditolyl, 1:8 amidonaphtholdisulfo-acid, and dihydroxynaphthalene, forming a grayish-black powder, soluble in water with violet color, soluble in ammonia with pure blue color, little soluble at ordinary temperature in sodium carbonate with violet, more easily on heating with dark-blue color, sparingly soluble in soda-lye at ordinary temperature with violet, more readily on heating with dark-violet to bluish-red color, soluble in concentrated sulfuric acid with blue color, which on dilution with ice-water turns reddish blue, while a fine dark-blue precipitate is gradually separated, insoluble in dilute hydrochloric and sulfuric acid; dyeing unmordanted cotton blue, which, after treatment with nitrous acid and combination with an alkaline solution of beta-naphthol changes into deeper blue or blue black, and having the qualities substantially as specified.

In testimony whereof we have signed our names to this specification in the presence of two subscribing witnesses.

JOHANN BAMMANN.
MORITZ ULRICH.

Witnesses:
R. E. JAHN,
G. H. STRAUSS.